United States Patent [19]
Kellner et al.

[11] Patent Number: 5,531,509
[45] Date of Patent: Jul. 2, 1996

[54] VEHICLE BRAKE SYSTEM

[75] Inventors: Andreas Kellner, Tamm; Peter Schubert, Leingarten, both of Germany

[73] Assignee: Robert Bosch GmbH, Stuttgart, Germany

[21] Appl. No.: 465,471

[22] Filed: Jun. 5, 1995

[30]  Foreign Application Priority Data

Aug. 25, 1994 [DE] Germany ................... 44 30 168.5

[51] Int. Cl.[6] .............. B60T 11/20; B60T 11/28; B60T 13/16; B60T 13/66
[52] U.S. Cl. .......... 303/114.1; 60/545; 188/358; 303/15; 303/113.4; 303/900; 303/155
[58] Field of Search .............. 303/113.1, 113.4, 303/119.1, DIG. 3, DIG. 4, 15, 166, 900, 50, 116.1, 114.1, 114.2, 20, 155; 60/545, 554, 550, 552, 547.1; 91/369.1, 376 R, 363 A, 369.4; 188/358, 359

[56]  References Cited

U.S. PATENT DOCUMENTS

| | | |
|---|---|---|
| 4,512,615 | 4/1985 | Kita et al. . |
| 4,653,814 | 3/1987 | Burgdorf ................... 303/114.1 |
| 4,667,476 | 5/1987 | Takata et al. . |
| 4,900,103 | 2/1990 | Stegmaier ................ 303/114.1 |
| 4,914,917 | 4/1990 | Schonlau ................ 303/114.1 |
| 5,044,700 | 9/1991 | Willmann ................ 188/358 |
| 5,112,115 | 5/1992 | Willmann et al. ............ 188/358 |

Primary Examiner—Douglas C. Butler
Attorney, Agent, or Firm—Edwin E. Greigg; Ronald E. Geigg

[57]  ABSTRACT

A vehicle brake system with a hydraulic brake booster. A booster pressure which is required for operating the brake booster is produced by throttling a flow of pressure medium which is supplied by a pump. For this purpose, a throttle valve is arranged between a pressure line which is connected to the pump and a return line which leads back to the pump, the adjustment of said pressure valve involves a building up of booster pressure in the pressure line by a solenoid, which booster pressure is applied to the brake booster. An electronic control unit which is connected to at least one sensor which outputs variable electric signal serves to control the throttle valve, the sensor detects activation of the brake pedal. For example, a pressure sensor which as a function of the boosting pressure supplies signals to the control unit which is developed to form a pressure controller and controls the throttle valve can be connected to the brake booster.

25 Claims, 4 Drawing Sheets

VEHICLE BRAKE SYSTEM

PRIOR ART

The invention relates to a vehicle brake system as defined hereinafter. A vehicle brake system of this kind is disclosed in U.S. Pat. No. 4,667,476. If the power source of such a vehicle brake system is constructed as a hydraulic constant pressure source and if the electrical control of said vehicle brake system is intact, a pedal force sensor detects the force exerted on a pedal lever by a driver's foot and transmits a signal of an assigned value to the electronic control. The electronic control controls a solenoid valve which then directs pressure medium from the power source into a brake booster chamber, and as a result a brake booster piston there is subjected to pressure and displaced so that brake pressure is produced in an assigned main brake cylinder. Here, the brake booster piston is in advance of a pedal plunger which can be displaced by means of the pedal lever.

As a result, the main brake cylinder is activated exclusively by means of the brake booster piston. A travel simulator, which is coupled to the pedal plunger and has a simulator spring, has the effect that the driver has to adjust the pedal lever with increasing pedal force and as a result can set a desired braking effect by sensation. If the electronic control is defective and/or the power source is not operating sufficiently well, the driver can activate the main brake cylinder via the pedal lever and the pedal plunger in order to produce braking force. If only the electronic control is defective, there is a shortfall in energy supplied by the foot of the driver during the production of braking force and consumed as the simulator spring is compressed. The solenoid valve is constructed as a multi-position directional control valve and has two electromagnets for variable magnetic forces. Such a multi-position directional control valve has relatively narrow throughflow areas and can therefore tend to become blocked which is disadvantageous. However, because this multi-position directional control valve also serves to divert the fluid from the brake booster, when a blockage occurs there is also the risk of the vehicle brake system failing completely or of a braking effect not ceasing and the vehicle not being able to carry on moving in a manner required by the traffic conditions. There is also the risk that when the brakes are not released sufficiently they will become overheated during traveling and be damaged or even made completely unusable.

The invention is based on the object of avoiding those disadvantages of the previously known braking system which may occur as a result of an at least partially blocked multi-position directional control valve.

This object is achieved according to the invention by means of the a hydraulic constant-current power source in combination with a valve arrangement which is assigned to the brake booster and by virtue of its design is less inclined to experience blockages and in which large valve throughflow areas which are on principle insensitive to blockages are used. Further advantageous features of the invention are obvious from the drawing and the description.

BRIEF DESCRIPTION OF THE DRAWINGS

A plurality of exemplary embodiments of the vehicle brake system according to the invention are illustrated in the drawing.

DESCRIPTION OF THE EXEMPLARY EMBODIMENTS

Figure 1:
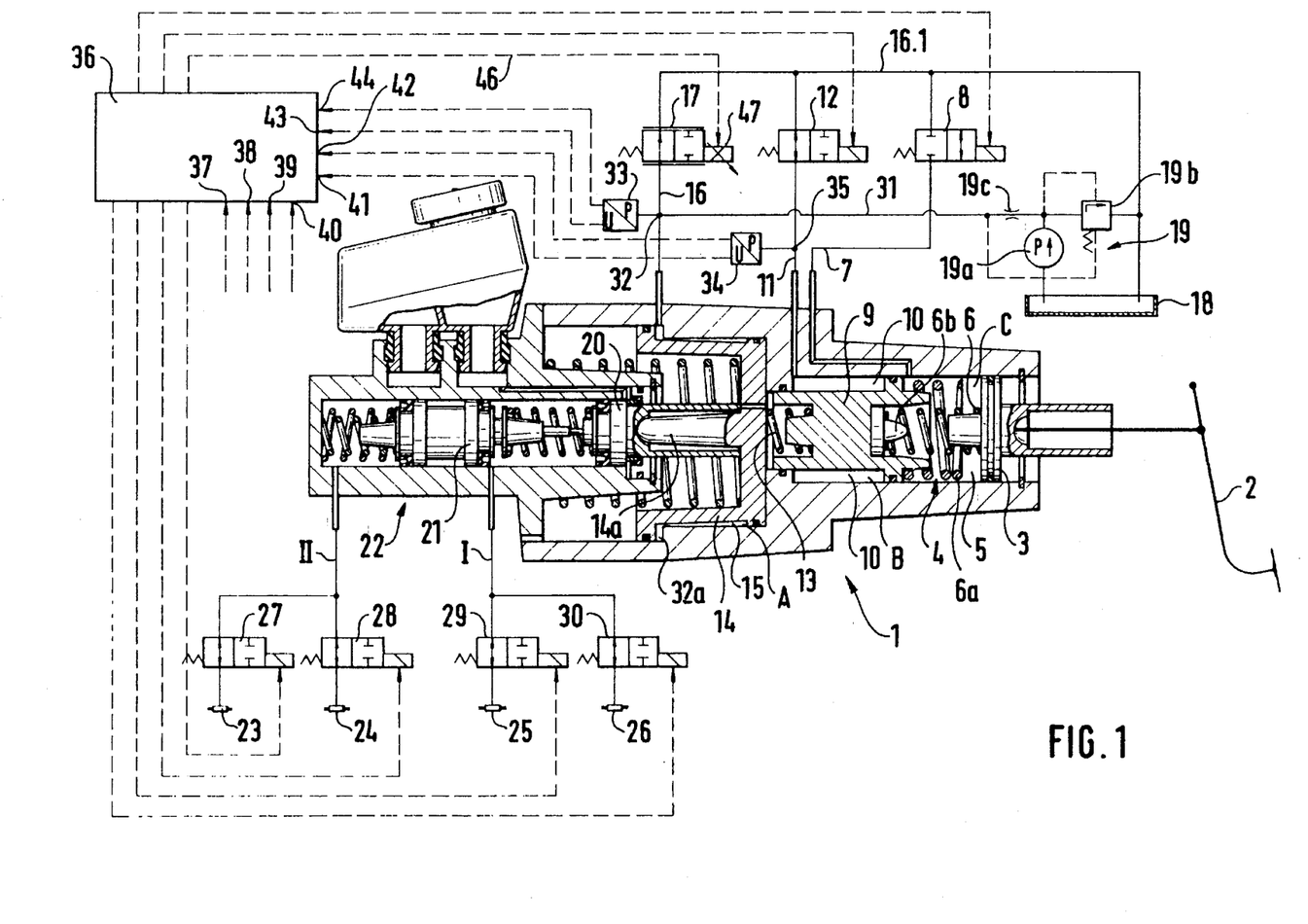
FIG. 1 shows a diagrammatic drawing of the vehicle brake system according to the invention and a brake booster in longitudinal section.

A vehicle brake system according to FIG. 1 has a stepped cylinder which includes a brake booster 1 which can be activated by a driver via a brake pedal 2 and a pedal piston 3. The pedal piston 3 is adjoined by a travel simulator 4 which is located inside a chamber 5, within which the pedal piston 3 can be displaced. Within the chamber 5, the travel simulator 4 has at least one simulator spring 6. This simulator spring 6 rests on the pedal piston 3 and thus determines the initial position of this pedal piston 3. A second simulator spring 6a can be arranged around the first simulator spring 6 coaxially to said simulator spring 6. Furthermore, a pin-like rubber body may be provided as a further simulator spring 6b, said rubber body extending into one end of the first simulator spring 6 and being of shorter design than the first simulator spring 6 and pointing toward the pedal piston 3. Preferably, the additional simulator springs 6a and 6b are constructed such that when the pedal piston 3 is displaced by means of the brake pedal 2 they successively come into effect so that the reaction force which can be produced in total by the simulator springs 6, 6a and 6b increases progressively counteracting pivoting of the brake pedal 2. Thus, for example small braking forces desired by the driver can be metered well and large braking forces do not require excessively large amounts of brake pedal travel. The simulator springs 6, 6a and 6b are supported on a piston 9 which can also be displaced in the chamber 5. Between the piston 9 and the pedal piston 3, a fluid line 7 leaves the chamber 5 and leads to a solenoid valve 8. The solenoid valve 8 is constructed as a 2/2 way valve and is closed in the electrically deactivated state. On the side facing away from the simulator spring 6a, the piston 9 is of thinner construction over parts of its length so that an annular chamber 10 is located in the region of this part of its length and in the extension of the chamber 5. A fluid line 11 which leads to a further solenoid valve 12 connected with this annular chamber 10. This solenoid valve 12 is constructed as a 2/2 way valve which is open in the electrically deactivated state. A spring 13 is directed toward the part of the piston 9 which has the thinner area, said spring 13 being supported on a booster piston 14 which in its position of rest, which corresponds to its home position, also determines the home position of the piston 9.

The booster piston 14 is constructed as a stepped piston whose smaller diameter is at the spring 13 or the piston 9 and whose larger diameter is at a distance from the piston 9. Inside the brake booster 1, the booster piston 14 is arranged in a sealed and displaceable manner and bounds a booster pressure space 15 inside the brake booster 1. Accordingly, the booster pressure space 15 is constructed essentially as an annular space from which a fluid line 16 leads. The line 16 leads to a throttle valve 17 which is normally completely open. This throttle valve 17 is then adjoined by a return line 16.1 which leads to a reservoir 18. The throttle valve 17 can be controlled in a manner described later. The reservoir 18 supplies a fluid power source 19. The latter has for example a pump 19a and valve means 19b for diverting quantities of pressure medium back to the reservoir which are fed by the pump 19a in excess of a preselected constant flow. In order to produce the constant flow all that is significant therefore is for the pump 19a to be driven at a minimum speed of revolution. Here, the valve means 19b is constructed in the form of a difference pressure control valve which can be controlled as a function of a pressure difference which comes about when there is a flow through a throttle 19c between an inflow side (not designated) of the throttle and an outflow side (not designated) of the throttle 19c. Alternatively, a so-called 3-way compensated flow control valve which is complete in itself and is known from general hydraulics can be used.

The return line 16.1 is additionally connected to the valve means 19b and also to the solenoid valves 8 and 12 to return fluid to reservoir.

The booster piston 14 has a plunger 14a which is directed toward a primary piston 20 of a hydraulic tandem main brake cylinder 22 which is combined with the brake booster 1, for the purpose of displacing this primary piston 20. Pressure which arises by displacing the primary piston 20 in the brake circuit I also acts on a secondary piston 21 which, for its part, produces pressure in a brake circuit II. Because such a tandem main brake cylinder 22 can be found in the prior art it is not necessary to provide constructional details of it.

For example, the brake circuits I and II lead to wheel brake cylinders 23, 24, 25 and 26 of for example four wheel brakes for four vehicle wheels. In the exemplary embodiment, in each case 2/2 way solenoid valves 27, 28, 29 and 30 are installed in the braking circuits I and II between the wheel brake cylinders 23, 24, 25 and 26 and the tandem main brake cylinder 22. These 2/2 way solenoid valves 27, 28, 29 and 30 are open in the electrically deactivated state so that a sufficient displacement of the primary piston 20 results in brake pressures in the wheel brake cylinders 23, 24, 25 and 26.

A pressure line 31 leads from the hydraulic constant flow source 19 to a node point 32 which is located in the line 16 for connection with line 16. A pressure sensor 33 which is capable of converting a pressure variable P into a dependent voltage variable U is additionally connected to the node point 32. For safety reasons, the conversion into the voltage U takes place twice so that redundant voltages are produced.

In a comparable manner, a node point 35 to which a further pressure sensor 34 is connected is installed in the line 11. This pressure sensor 34 is advantageously also constructed in such a way that it is capable of converting a pressure P into two redundant voltages U.

Both pressure sensors 33 and 34 supply signals in the form of redundant voltages U to an electronic control unit 36. For this, the electronic control unit 36 has, apart from inputs 37, 38, 39 and 40 for signals from wheel rotation sensors which are known per se and therefore not illustrated, further inputs 41, 42, 43 and 44 for the aforesaid voltages U. The electric control unit 36 is designed to supply the solenoid valves 8 and 12 with electric control currents in accordance with the prevailing conditions. Furthermore, a current sensor 45 (illustrated in FIG. 6) which communicates on the input side with an electric control line leading to the throttle valve 17 is arranged in the electronic control unit 36. The current sensor 45 is designed to convert a measured current I into a voltage U. The electric line 46 leads to a solenoid 47 for producing adjustment forces of different values for adjusting the throttle valve 17. Therefore, by means of the current sensor 45 the electric current flowing to the solenoid 47 can be measured and as a result the adjustment force of the solenoid 47 can also be measured. Therefore, a so-called proportional magnet is obtained together with iron components such as an armature and stator which are not illustrated.

Figure 2:
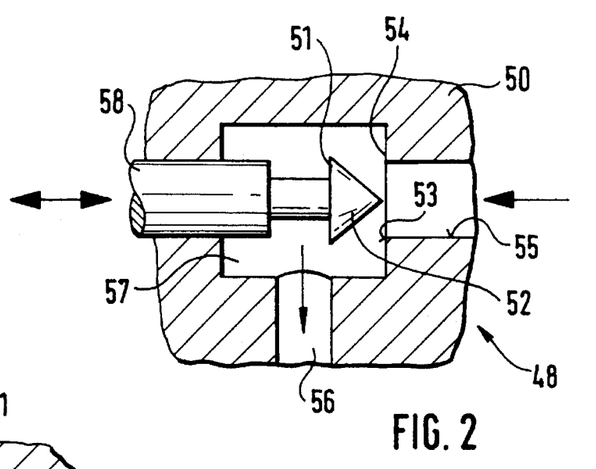
FIG. 2 shows a first exemplary embodiment of a throttle valve, which is essential to the invention, of the vehicle brake system.
Figure 3:
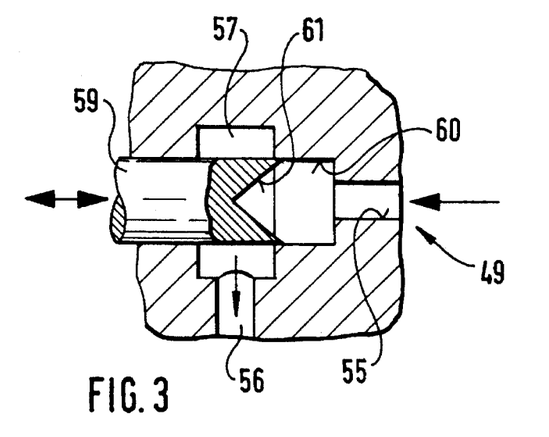
FIG. 3 shows a second exemplary embodiment of the throttle valve.

FIGS. 2 and 3 show two exemplary embodiments for the valve bodies of the throttle valve 17. Here, FIG. 2 represents a so-called needle throttle valve 48. In contrast, FIG. 3 shows an embodiment as a so-called sliding spool flow control valve 49.

In the exemplary embodiment illustrated in FIG. 2, a needle 51 is displaceably arranged as a valve body in a valve housing 50, the pointed-cone-shaped part 52 serves as a throttle body which can be moved in relation to a valve seat 53, fixed to the housing, in order to change a throttling area. The valve seat 53 is located at an inlet 55 of the throttle valve 48. And an outlet 56 of the throttle valve 48 is located downstream of the valve seat 53 and is arranged transversely with respect to the inlet 55 in the valve housing 50. Between the valve seat 53 and the outlet 56 there is a valve chamber 57 which surrounds the needle 51 and its throttle body 52 with radial spacing. The needle 51 has a valve shaft 58 whose end (not illustrated) is coupled to an armature (not illustrated) of a proportional magnet and a restoring spring (not illustrated).

FIG. 3 shows the sliding spool flow control valve 49 which, instead of a needle 51 with a throttle body 52, has a throttle body 59 which is constructed essentially in the manner of a piston and can dip into a hole 60 in the housing, which hole 60 is connected to an inlet 55. At the end which can dip into the hole 60 in the housing, the piston throttle body 59 has on its front side a V-shaped recess 61 in the manner of a so-called fine control notch known from general hydraulics. In turn, the piston throttle body 59 can be displaced in a valve chamber 57 and an outlet 56 leaves this valve chamber 57. In turn, the piston throttle body 59 can be displaced electromagnetically.

MODE OF OPERATION

If the brake system is intact and the pump 19a is for example driven by means of a vehicle engine (not illustrated), the auxiliary pressure source 19 which is designed as a constant flow source operates. As a result, starting from the pump 19a, pressure medium which is sucked out of the reservoir 18 flows through the pressure line 31, the line 16, the throttle valve 17 and the return line 16.1 back to the reservoir 18. If the auxiliary pressure source 19 is operating, the electronic control unit 36 moves the solenoid valve 8 into its open position and the solenoid valve 12 into its closed position. This results in the chamber 5 of the travel simulator 4 now being opened in the direction of the reservoir 18, whereas the annular chamber 10 is closed off in relation to the return line 16.1 and only communicates with the pressure sensor 34. As a result of this, the pedal piston 3 can be displaced in relation to the piston 9 whereas the piston 9 is hydraulically supported against displacement in relation to the brake booster 1 if the volume elasticity of the pressure sensor 34 is considered to be negligibly small.

When the brake pedal 2 is not activated, the throttle valve 17 is, as already indicated, opened entirely so that a volume flow forced through the throttle 19c by the pump 19a passes through the line 31, the line 16, the throttle valve 17 and the return line 16.1 back to the reservoir 18. Because the throttle valve 17 is opened entirely, the pressure sensor 33 only indicates a pressure which is necessary to overcome flow resistances in the valve 17 and in the return line 16.1.

Accordingly, the booster pressure chamber 15 is virtually unpressurized and therefore the booster piston 14 assumes the basic position illustrated in FIG. 1.

If the brake pedal 2 is activated by the driver, the pedal piston 3 is displaced against the simulator spring 6. Since, as already mentioned, the solenoid valve 12 is closed during this process, the piston 9 forms a counterbearing for the simulator spring 6. Since, as already mentioned, the solenoid valve 8 is opened, pressure medium can escape from the simulator 4 so that, discounting sealing friction, a resistance which is dependent on the degree of compression of the simulator spring 6 is opposed to the displacement of the pedal piston 3. Depending on the degree of adjustment of the brake pedal 2, the other simulator springs 6a and 6b can also successively come into effect against the pedal piston 3. Since, as said, the piston 9 is hydraulically supported, a pressure is produced in the annular chamber 10 as a result of the compression of the at least one simulator spring 6. This pressure is detected by the pressure sensor 34 and converted into electric voltages which pass into the control unit 36. During this process, voltages produced by the pressure sensor 33 indicate voltages which are lower in comparison with said voltages so that the control unit 36 detects a difference to be compensated between the voltages from the pressure sensor 34 which is used as a desired value transmitter and voltages from the pressure sensor 33 which is used as an actual value transmitter for the pressure which is present in the booster pressure chamber 15 and is in turn a measure of a force acting on the primary piston 20 and thus of the pressure in the brake circuit I and also the pressure in the brake circuit II. On the basis of the difference detected between the desired value and actual value, the control unit 36 controls, via the electric line 46 and the solenoid 47, the throttle valve 17 with the effect that a throughflow resistance is produced inside the throttle valve 17. If the throttle valves 48 and 49 in FIGS. 2 and 3 are considered, this means that the throttle body 52 is dipped more deeply into the hole 60 in the housing in the direction of the associated valve seat 53 or the valve body 59 and a part of the recess 60 located congruently with respect to the valve chamber 50 is reduced and as a result has an increasingly stronger throttling effect. Consequently, in the line 16 a pressure is built up which acts as a booster pressure on the booster piston 14 and as a result produces a force directed against the main cylinder 22. As a result, pressure which ultimately keeps equilibrium with the force originating from the booster piston 14 is produced in the main cylinder 22. During the displacement of the booster piston 14 which takes place at the same time, the spring 13 is at least partially relaxed which, however, is no longer troublesome because this spring 13 only has the function of a restoring spring. When the difference between a desired value set by the brake pedal 2 and the actual value detected by the pressure sensor 33 becomes smaller as a result of the rise in pressure in the line 16, the control unit 36 changes the electric current fed through the electric line 46 to the solenoid 47, in such a way that an increase in pressure in the line 16 is terminated. It is possible to detect that more and more force is required to displace the brake pedal 2 and finally brake pressures corresponding to the force applied in the brake circuits I and II are obtained.

If the driver reduces the force on the brake pedal 2 so that said pedal moves at least partially in the direction of the home position, the pressure in the pressure sensor 34 drops accordingly and consequently the size of the desired value indicated as voltages also drops. This is detected by the electronic control unit 36 which therefore reduces the electric current fed to the solenoid 47 so that the throttle valve is adjusted for the effect of reducing throttling. Consequently, the pressure in the line 16 will drop and as a result the booster piston 14 will move in the direction of its home position with the intended consequence that brake pressures drop in the brake circuits I and II.

If the actual value has reached the desired value, the solenoid valves 27 to 30 connected with the wheels are closed by the control unit 36 by means of electric current and as a result the brake pressure in the four wheel brake cylinders 23, 24, 25 and 26 is shut in. By decreasing the electric current of the magnet 47 of the throttle valve 17, the control unit 36 can now reduce the brake boosting pressure in the booster chamber 15, and thus also the pressures in the main brake cylinder 22, to a smaller value without having an effect on the wheel brakes 23 to 26. This state can be maintained until the desired value is changed when the pedal force changes. As a result of this measure, the hydraulic throttle losses occurring in the throttle valve 17 can be significantly lowered and the pressure medium fed by the pump 19a is slightly heated. When a change in the desired value is detected by the control unit 36, the electric current for the electromagnet 47 is firstly increased to the value before the reduction so that the original pressure in the booster chamber 15 and in the main brake cylinder 22 is restored and then the solenoid valves 27 to 30 are electrically deactivated and as a result opened. Subsequently, the new desired value can serve to set differently the electric current flowing to the solenoid 47.

By closing, for example, the solenoid valves 27, 28 and 29 by means of the control unit and by leaving the solenoid valve 30 open, a pressure prevailing in the wheel brake cylinders 23, 24 and 25 can be kept constant and a pressure present in the wheel cylinder 26 can be varied alone by changing the pressure of the booster chamber 15 by means of the throttle valve 17. This opens up the possibility of carrying out antilock protection by means of this vehicle brake system, if the wheels of the vehicle are assigned wheel speed sensors (not illustrated), these are connected to the electronic control unit 36, and the electronic control unit is designed for the detection of the risk of wheel lock and for setting a booster pressure which lies below a desired value produced in the pressure sensor 34.

Because, as a result of the constructional design of the brake booster 1, it is sufficient only to produce booster pressure in the booster chamber 15 in order to obtain brake pressures in the brake circuits I and II, this vehicle brake system is also suitable for monitoring drive slip if the control unit 36 is designed to detect undesirably high drive slip at at least one drive wheel and to set a pressure in the booster chamber 15 with the result that it is possible to produce varieties in brake pressure in the brake circuits I and II and to pass on such brake pressures only to that wheel brake cylinder at whose wheel the drive slip is to be monitored. In this process, the electronic control unit 36 for monitoring drive slip leaves the respective solenoid valve of the solenoid valves 27, 28, 29 or 30 open and respectively blocks the at least one other solenoid valve whose associated wheel brake cylinder is not required for monitoring drive slip.

In a power braking mode, that is to say when braking is occurring with power assistance, the booster piston 14 moves away from the piston 9. In this process, an initially present force effect which is a result of the installation of the spring 13 can become weaker or even disappear. Also because, as already mentioned, the spring 13 is of weak construction, displacements in the booster piston 14 are virtually without effect on the piston 9 so that when antilock protection is taking place there is no effect on the brake pedal 2. As a result, the degree of antilock protection on the brake pedal cannot be sensed. If it is desired to detect the antilock protection taking place, the electronic control unit 36 can be designed in such a way that when the antilock brake system begins to operate the solenoid valve 8 closes. As a result, a volume of pressure medium located in the chamber 5 is enclosed in this chamber 5 with the consequence that an increased force effect on the brake pedal 2 can no longer cause compression of the at least one simulator spring 6. As a result, the brake pedal 2 feels "hard". This causes the driver to conclude that at least one wheel is overbraked and as a result operation of the antilock brake system has been triggered. From the amount of travel which the brake pedal has previously passed through against the driver it is possible for him to make conclusions as to the degree of grip of the surface of the carriageway and to adapt his style of driving to it.

Since usually a large throttling area 54 of the throttle valve 17 is available, according to FIG. 2, to a flow of fluid supplied by the pump 19a, at least some of which fluid flows through the throttle 19c, the line 31 and the throttle valve 17, blocking of this throttle valve 17 and thus undesired activation of the brakes is avoided. The same applies for the throttle valve 17 if it is designed, according to FIG. 3, as a sliding spool flow control valve 49 and the recess 61 provided in it makes available a sufficiently large area for fluid to flow through. The size of the control force for the respective throttle body 52 or 59 with the recess 61 and thus the size of the electric current through the valve coil 47, which is illustrated in the circuit diagram in FIG. 1, is, in the two designs of throttle valve according to FIGS. 2 and 3, approximately proportional to the difference in pressure between the respective valve inlet 55 and the respectively associated valve outlet 56. The electric current which flows through the solenoid 47 can be used as an auxiliary variable for the pressure upstream of the throttle valve 17, 48 or 49. For example, such an auxiliary variable can be observed in relation to the size of a signal from the pressure sensor 33 by the control unit 36 in order to monitor the auxiliary pressure source 19.

In the event of the pump 19a, or an engine operating it, being defective, or in the event of a fault in the electronic control unit 36 or in at least one of the pressure sensors 33, 34, the solenoid valve 8 switches into its closed position or assumes its closed position so that pressure medium cannot flow off from the chamber 5. The solenoid valve 12 then connects the chamber 10 to the return line 16.1. Since neither the solenoid valve 8 nor the solenoid valve 12 serve to set or change boosting pressure, they can preferably be constructed as seat valves with large opening areas which have little tendency to become blocked and therefore increase the operational reliability of the brake system. Displacement of the brake pedal 2 and thus also of the pedal piston 3 brings about, via the fluid which is now enclosed, displacement of the piston 9, fluid flowing to the reservoir 18 from the annular chamber 10. As a result, the booster piston 14 can be displaced by muscular force virtually without loss of pedal travel and without loss of power in the travel simulator 4. However, during this process it is necessary for the spring 13 to be compressed first so that the piston 9 rests against the booster piston. The tandem main brake cylinder 22 is activated in this case by hydraulic mechanical means without the aid of the pump 19a. The throttle valve 17, 18 or 49 is opened entirely because, due to the opened solenoid valve 12, it is not possible to detect a desire of the driver to brake via the pressure sensor 34 and when the brake pedal is not activated none of the brakes are activated.

Figure 4:
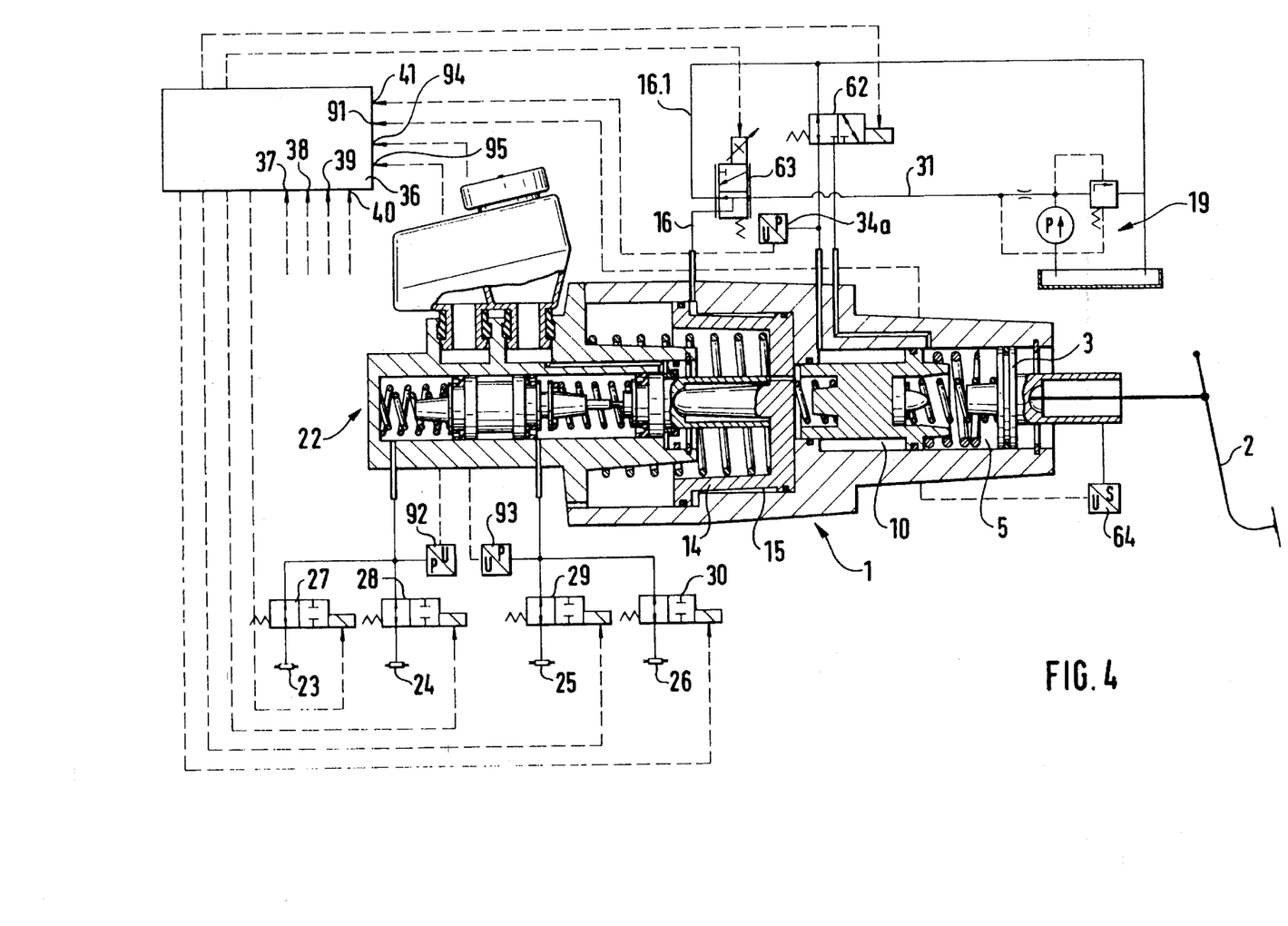
FIG. 4 shows a further exemplary embodiment of the vehicle brake system.

FIG. 4 shows an exemplary embodiment which deviates from the vehicle brake system according to FIG. 1. According to FIG. 4, the two chambers 5 and 10 are connected to a single valve 62 of a type of 3/2 way solenoid valve, and a throttle valve 63 has a different design from that of the throttle valves 48, 49 according to FIGS. 2 and 3.

Figure 5:
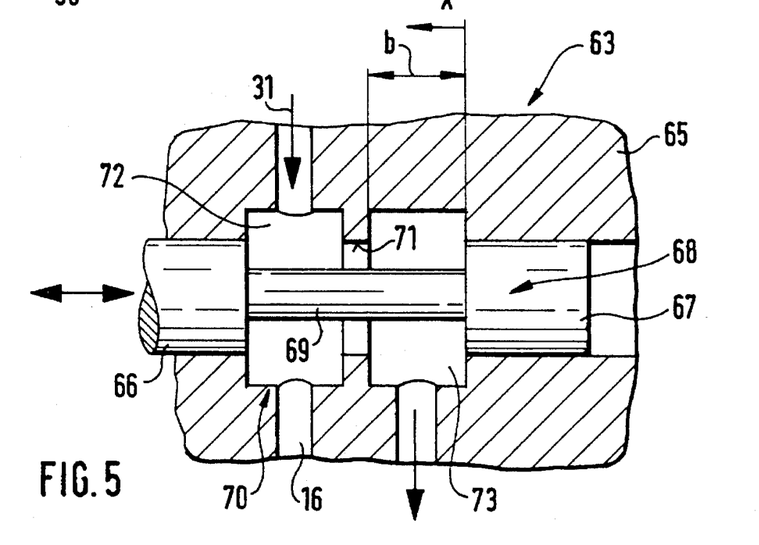
FIG. 5 shows an additional exemplary embodiment of the throttle valve and FIG. 6 shows a circuit diagram of an electronic control unit of the vehicle brake system.

FIG. 5 shows the design of the throttle valve 63 in longitudinal section. It has a housing 65 in which a piston head 68 is arranged, provided with two pistons 66 and 67 of the same external diameter. Both pistons 66 and 67 are rigidly connected by means of a rod 69 which moves through a valve chamber 70.

In the center of the length of the valve chamber 70, an annular shoulder 71 whose internal diameter corresponds to the external diameter of the two pistons 66 and 67 protrudes radially inwards. The annular shoulder 71 separates the valve bodies 70 into an inlet chamber 72 with connection to the pressure lines 31 and 16 and finally into the booster pressure chamber 15 and an outlet chamber 73 with connection to the return line 16.1. Depending on the design of the throttle valve 63, the line 16 which leads to the servo pressure chamber 15 can also be connected to the pressure line. As a result, an opening, illustrated at the bottom left in FIG. 5, to which the reference symbol 16 is assigned can be omitted. It is to be noted that the throttle valve 63 is pressure-compensated by the two pistons 66 and 67 which are of equal size and is constructed in the embodiment indicated as a 3/2 way valve. However, it can also be redesigned with omission of one port to form a 2/2 way valve. As a result of the axial pressure compensation due to the equal diameters of the pistons 66 and 67, the throttle valve 63 can be activated more easily. Consequently, less force is necessary to adjust it counter to the flow of fluid from the pressure line 31. Therefore, the magnetic forces can be smaller, as a result of which a smaller and lighter solenoid 47, and consequently also smaller and lighter magnetic components, can be used. These components, like the restoring spring which opens the throttle valve 63 when the solenoid 47 is electrically deactivated, are not illustrated. Furthermore, as a result of the smaller amount of force required, the power consumption of the solenoid is also smaller.

Instead of the pressure sensor 34 which, according to FIG. 1, is designed to output two redundant voltages, according to FIG. 4 a pressure sensor 34a which is of simple design and only outputs one voltage and an additional travel sensor 64, on the pedal plunger 3, may also be provided, said travel sensor 64 supplying a voltage signal to an input 91 of the electronic control unit 36 as a function of the travel of the brake pedal 2. When the brake pedal 2 is activated, two signals are then produced so that, via the same kind of signal tendency, an electronic control unit can then in turn detect with sufficient reliability a driver's desire to brake.

Moreover, the brake system according to FIG. 4 resulting from the replacement of the two 2/2 way solenoid valves 8 and 12 for the 3/2 way solenoid valve 62 and the use of the travel sensor 64 in conjunction with the pressure sensor 34a and from the replacement of the pressure sensor 33 in FIG. 1 for two pressure sensors 92, 93 which are of simpler design and each output only one signal, operates in the same way as the brake system according to FIG. 1. However, it is no longer possible to produce a hard brake pedal sensation during antilock protection operation.

The arrangement of sensors 34a and 64 illustrated in FIG. 4 can also be combined with the arrangement of the valves according to FIG. 1, as a result of which a further exemplary embodiment (not shown) is obtained.

Figure 6:
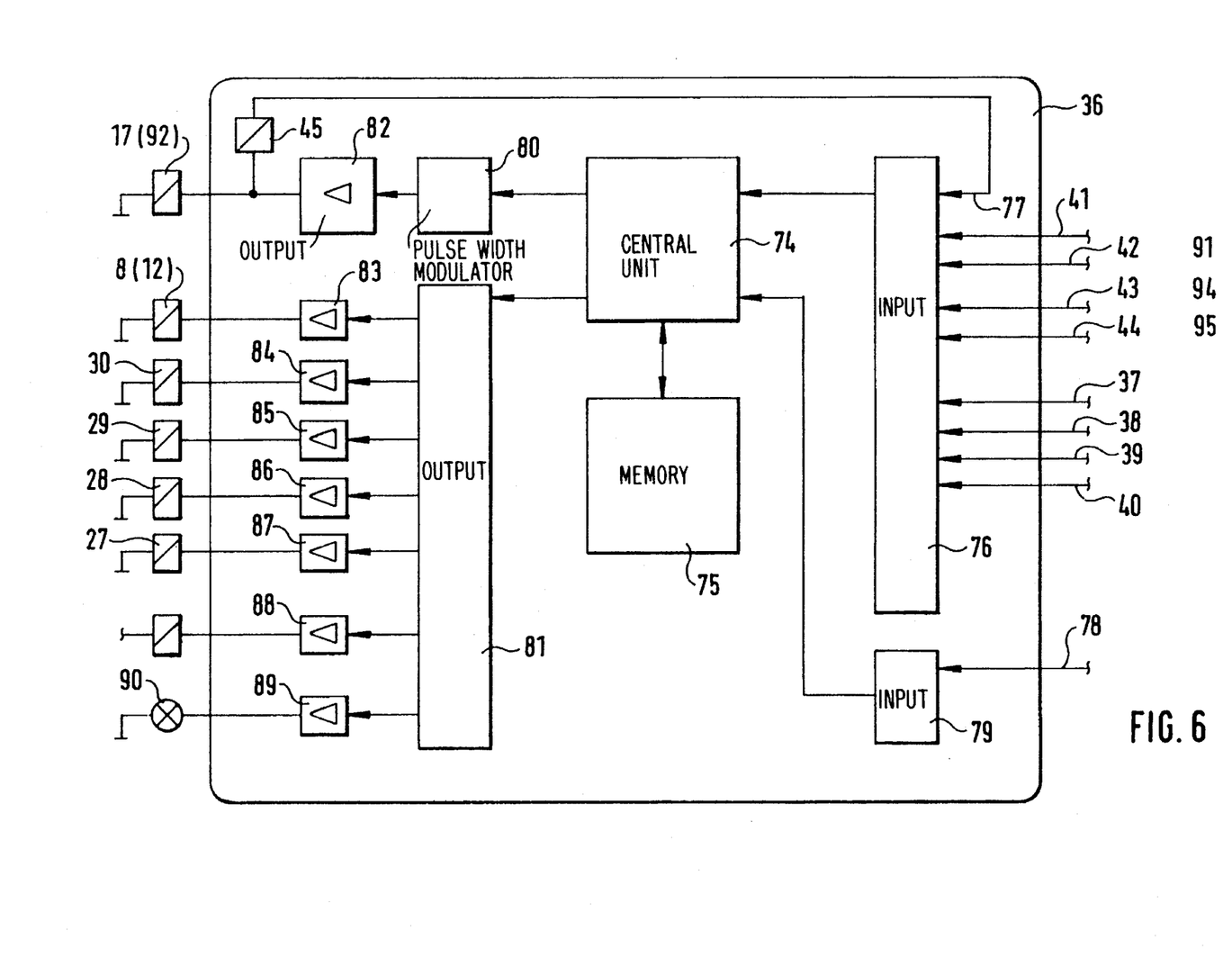

Finally, in FIG. 6, the structure of the electronic control unit 36 is illustrated. It comprises a central unit 74, a memory 75, an input unit 76 in which analog signals coming from signal inputs 37 to 44, 77, 91, 94 and 95 are adapted and converted into digital signals, a further input unit 79 in which a brake light switch signal 78 of a brake light switch (not illustrated) is adapted to the voltage range of the central unit 74, a pulse-width modulator 80 which is fitted with an output stage 82 for supplying the solenoid 47 of the throttle valve 17 or 48, 49 or 63. The output stage 82 is assigned a current sensor 45 which supplies a voltage which is proportional to the current flowing through the solenoid 47. This voltage is present at the input 77 of the input unit 76. The central unit 74 controls an output unit 81, the output stages 83 to 87 for supplying power to the solenoid valves 8 and 12 and 63 and the solenoid valves 27 to 30 as well as further output stages 88, 89 for outputting control signals for changing the power of a vehicle drive engine (not illustrated) when a drive slip control has become necessary, and for activating a monitoring light 90.

The foregoing relates to preferred exemplary embodiments of the invention, it being understood that other variants and embodiments thereof are possible within the spirit and scope of the invention, the latter being defined by the appended claims.

We claim:

1. A vehicle brake system comprising a main cylinder for supplying wheel brake cylinders with brake pressure, a hydraulic brake booster which is assigned to the main cylinder for activating fluid pressure and which has a booster piston (14) which can be displaced in a booster pressure chamber (15) in a direction of the main cylinder, a reservoir, a hydraulic energy source connected with said reservoir, a pump (19a) and a relief valve means (19b) and a pressure line (31) for producing boosting pressure for the booster chamber for hydraulically displacing the booster piston, a brake pedal for emergency displacement of the booster piston when the energy source fails, a travel simulator (4) which is arranged between the brake pedal and the booster piston which has a simulator spring which can be compressed during a brake boosting mode, an electrically controllable throttle valve (17, 48, 49, 63) arrangement which is connected to the pressure line and from which a return line (16.1) leads to the reservoir for adjusting boosting pressure in the booster chamber, at least one first sensor in the form of at least one pressure sensor (34, 34a) which can be adjusted by means of the brake pedal in order to output an electric reference signal variable as a function of the activation of the brake pedal and an electronic control unit which is connected to the at least one first sensor in order to control the throttle valve arrangement electrically dependent upon said electric reference signal variable when the brake pedal is activated, wherein the throttle valve arrangement normally has a wide flow area and the booster chamber (15) is permanently connected to the pressure line (31).

2. The vehicle brake system as claimed in claim 1, wherein the throttle valve (17, 48, 49, 65) is constructed as a proportional solenoid valve with a throttle valve adjusting solenoid (47), the throttle valve adjusting solenoid (47) producing adjustment forces, when it is electrically excited, for making a throughflow area of the throttle valve (17, 48, 49, 65) narrower.

3. The vehicle brake system as claimed in claim 2, wherein the control unit (36) is connected to at least one further sensor (33, 92, 93) which is in the form of a pressure sensor and communicates with the vehicle brake system in order to output one electric feedback variable to the control unit (36) in dependence of the pressure in said vehicle brake system, and said control unit (36) controls the throttle valve (17, 48, 49, 65) via the throttle valve adjusting solenoid (47).

4. The vehicle brake system according to claim 2, wherein the throttle valve (17, 48) has a throttle body (52) which is constructed as a conical part and can be moved against a valve seat (53), connected to the pressure line (31), by means of the throttle valve adjusting solenoid (47) counter to a pressure which can be set in the pressure line (31).

5. The vehicle brake system as claimed in claim 2, wherein the flow control throttle valve (49) has a sliding valve as throttle body (59) which can be moved in relation to a hole (60) in a housing which starts from an annular hole edge in order to change the throughflow area of the throttle valve (49).

6. The vehicle brake system as claimed in claim 2, wherein the throttle valve (63) has, as a throttle body, a piston head (68) which is hydraulically compensated for axial force, with a first piston (66), a piston rod (69) and a second piston (67) whose diameter is the same size as that of the first piston (66), and the second piston (67) is moved with excitation of the throttle valve adjusting solenoid (47) to form an annular shoulder (71) which adjoins an inlet chamber (72) which is connected to the pressure line (31).

7. The vehicle brake system as claimed in claim 2, wherein the travel simulator (4) has, within a cylindrical chamber (5) aligned coaxially with respect to the booster piston (14), a pedal piston (3) on the brake pedal side and a piston (9) on the booster piston side, and at least one simulator spring (6, 6a, 6b) between said pedal piston (3) and said piston (9), and a first solenoid valve (8) which is closed for operation of the brakes with power assistance is arranged between the chamber (5) and the return line (16.1).

8. The vehicle brake system as claimed in claim 1, wherein the control unit (36) is in the form of a closed loop type control unit and is connected to at least one further sensor (33, 92, 93) which is in the form of a pressure sensor and communicates with the vehicle brake system in order to output an electric feedback variable to the control unit (36) in dependence of the pressure in said vehicle brake system, and said control unit (36) controls the throttle valve (17, 48, 49, 65) via the throttle valve adjusting solenoid (47).

9. The vehicle brake system according to claim 8, wherein the throttle valve (17, 48) has a throttle body (52) which is constructed as a conical part and can be moved against a valve seat (53), connected to the pressure line (31), by means of the throttle valve adjusting solenoid (47) counter to a pressure which can be set in the pressure line (31).

10. The vehicle brake system as claimed in claim 8, wherein the flow control throttle valve (49) has a sliding valve as throttle body (59) which can be moved in relation to a hole (60) in a housing which starts from an annular hole edge in order to change the throughflow area of the throttle valve (49).

11. The vehicle brake system as claimed in claim 8, wherein the throttle valve (63) has, as a throttle body, a piston head (68) which is hydraulically compensated for axial force, with a first piston (66), a piston rod (69) and a second piston (67) whose diameter is the same size as that of the first piston (66), and the second piston (67) is moved with excitation of the throttle valve adjusting solenoid (47) to form an annular shoulder (71) which adjoins an inlet chamber (72) which is connected to the pressure line (31).

12. The vehicle brake system as claimed in claim 8, wherein the second pressure sensor (33) is arranged so as to communicate with the booster pressure chamber (15) and is designed to output two redundant signals as a function of pressure prevailing in the booster pressure chamber.

13. The vehicle brake system as claimed in claim 8, wherein the second pressure sensor (92, 93) which communicates with the vehicle brake system is constructed as a brake pressure sensor which communicates with the main brake cylinder (22).

14. The vehicle brake system as claimed in claim 13, wherein the main cylinder (22) is designed to supply two brake circuits (I, II), and a second separate pressure sensor (92, 93) is connected to each of the two brake circuits (I, II).

15. The vehicle brake system as claimed in claim 8, wherein the travel simulator (4) has, within a cylindrical chamber (5) aligned coaxially with respect to the booster piston (14), a pedal piston (3) on the brake pedal side and a piston (9) on the booster piston side, and at least one simulator spring (6, 6a, 6b) between said pedal piston (3) and said piston (9), and a first solenoid valve (8) which is closed for operation of the brakes with power assistance is arranged between the chamber (5) and the return line (16.1).

16. The vehicle brake system according to claim 1, wherein the throttle valve (17, 48) has a throttle body (52) which is constructed as a conical part and can be moved against a valve seat (53), connected to the pressure line (31), by means of a throttle valve adjusting solenoid (47) counter to a pressure which can be set in the pressure line (31).

17. The vehicle brake system as claimed in claim 16, wherein the throttle valve (17, 48) has an annular valve seat (53), and in that the throttle body (52) can be dipped into the annular valve seat (53) in order to make the flow area narrower.

18. The vehicle brake system as claimed in claim 1, wherein a flow control throttle valve (49) has a sliding valve as throttle body (59) which can be moved in relation to a hole (60) in a housing which starts from an annular hole edge in order to change the throughflow area of the flow control throttle valve (49).

19. The vehicle brake system as claimed in claim 1, wherein the throttle valve (63) has, as a throttle body, a piston head (68) which is hydraulically compensated for axial force, with a first piston (66), a piston rod (69) and a second piston (67) whose diameter is the same size as that of the first piston (66), and the second piston (67) is moved with excitation of a throttle valve adjusting solenoid (47) to form an annular shoulder (71) which adjoins an inlet chamber (72) which is connected to the pressure line (31).

20. The vehicle brake system as claimed in claim 1, wherein the travel simulator (4) has, within a cylindrical chamber (5) aligned coaxially with respect to the booster piston (14), a pedal piston (3) on a brake pedal side and a piston (9) on the booster piston side, and at least one simulator spring (6, 6a, 6b) between said pedal piston (3) and said piston (9), and a first solenoid valve (8) which is closed for operation of the brakes with power assistance is arranged between the chamber (5) and the return line (16.1).

21. The vehicle brake system as claimed in claim 20, wherein the piston (9) is of stepped construction starting from a region adjacent to the simulator spring (6), the step bounds an annular chamber (10), a fluid line (11) which leads from the annular chamber (10) to the return line (16.1) and in which a second solenoid valve (12) which is closed for operation of the brakes with power assistance is connected to the fluid line (11).

22. The vehicle brake system as claimed in claim 21, wherein the pressure sensor (34) which is adjusted by means of the brake pedal (2) is connected to the line (11).

23. The vehicle brake system as claimed in claim 22, wherein the pressure sensor (34) is designed to output two redundant voltage signals as a function of pressure in the annular chamber (10).

24. The vehicle brake system as claimed in claim 22, which includes a travel sensor (64) which is coupled to the brake pedal (2) in redundancy with the pressure sensor (34a) which communicates with the annular chamber (10).

25. A vehicle brake system as set forth in claim 1, in which said at least one first said at least one first sensor is in the form of travel sensor (64) linked to said travel simulator (4).

\* \* \* \* \*